(12) United States Patent
Hung et al.

(10) Patent No.: US 12,435,974 B2
(45) Date of Patent: Oct. 7, 2025

(54) MULTILAYER FILM MEASURING DEVICE AND MULTILAYER FILM MEASURING METHOD

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Ling-Kuei Hung, Miaoli County (TW); Jiang-Yun Zhou, Miaoli County (TW); Hung-Chuan Mai, Miaoli County (TW); Sheng-Chun Chuang, Miaoli County (TW)

(73) Assignees: Interface Technology (ChengDu) Co., Ltd., Chengdu (CN); Interface Optoelectronics (ShenZhen) Co., Ltd., Shenzhen (CN); General Interface Solution Limited, Miaoli County (TW)

( * ) Notice: Subject to any disclaimer, the term of this patent is extended or adjusted under 35 U.S.C. 154(b) by 218 days.

(21) Appl. No.: 18/197,832

(22) Filed: May 16, 2023

(65) Prior Publication Data

US 2024/0369354 A1    Nov. 7, 2024

(30) Foreign Application Priority Data

May 4, 2023    (CN) .......................... 202310488962.5

(51) Int. Cl.
*G01B 11/30*    (2006.01)

(52) U.S. Cl.
CPC .................................. *G01B 11/303* (2013.01)

(58) Field of Classification Search
CPC .................................................. G01B 11/303
See application file for complete search history.

(56) References Cited

U.S. PATENT DOCUMENTS

| | | | | |
|---|---|---|---|---|
| 5,475,370 | A * | 12/1995 | Stern ...................... | B64D 15/20 |
| | | | | 356/369 |
| 2018/0357462 | A1* | 12/2018 | Mackey .............. | G06V 40/1335 |
| 2019/0243147 | A1* | 8/2019 | Smithwick ......... | G02B 27/0103 |
| 2020/0096817 | A1* | 3/2020 | Richards ................ | G02B 27/32 |
| 2023/0236396 | A1* | 7/2023 | Hudman ................ | G02B 17/08 |
| | | | | 359/566 |

* cited by examiner

*Primary Examiner* — Michelle M Iacoletti
*Assistant Examiner* — Jarreas Underwood
(74) *Attorney, Agent, or Firm* — Troutman Pepper Locke LLP; Tim Tingkang Xia, Esq.

(57) ABSTRACT

A multilayer film measuring device, which comprises in sequence: a measuring module, a multilayer film to be measured, and a circular polarization module. When the measuring module can generate a laser beam through the circular polarization module to the multilayer film to be measured, a reflective polarizer of the multilayer film to be measured completely reflects the laser beam through the circular polarization module to the receiving module, and the laser beam shifted by a surface of a first waveplate of the multilayer film to be measured is absorbed by a second linear polarizer of the circular polarization module, so that the multilayer film can be measured accurately.

9 Claims, 10 Drawing Sheets

MULTILAYER FILM MEASURING DEVICE AND MULTILAYER FILM MEASURING METHOD

CROSS-REFERENCE TO RELATED APPLICATIONS

This application claim priority to Chinese application Numbered 202310488962.5, filed May 4, 2023, which is herein incorporated by reference in its' integrity.

FIELD OF THE INVENTION

The present invention relates to a measuring device, and more particularly to a multilayer film measuring device and a multilayer film measuring method, capable of eliminating the interference of reflected light signals of the multilayer film.

BACKGROUND OF THE INVENTION

In virtual reality technology, a virtual world is constructed by computers or electronic devices, and a special operating medium is used for the user to obtain sensory simulations provided by computers or electronic devices, so as to provide the effect of a virtual world. The aforementioned operating medium includes, for example, virtual reality glasses to provide visual information or virtual reality gloves to provide tactile information. Taking virtual reality glasses as an example, there are many kinds of virtual reality glasses on the market. One of the virtual reality glasses is used to cooperate with the display screen of a handheld electronic device (such as a mobile phone or a tablet computer), so that the user can watch virtual reality with visual effects in real time without location restrictions. Such virtual reality glasses do not require additional electronic circuits or chips. However, the virtual reality glasses on the market are bulky and inconvenient to carry, and cannot meet the needs of most consumers.

For pancake virtual reality optics, the polarizing film is a multi-layer laminated film structure, including as a waveplate (QWP), a reflective polarizer (RP) and a linear polarizer (LP) in sequence. A laser interferometer is used to test whether the surface topography of the reflective polarizer (RP) of the multilayer laminated film is within the range of optical specifications. In general, the measuring device measures the surface topography by receiving the reflected light signal from the surface of the reflective polarizer (RP).

FIG. 1 is a schematic view of a conventional measuring device. The conventional measuring device uses a laser emitter 1 to inject a laser light source 10 onto a multilayer laminated film 11. Because the multi-layer laminated film 11 is a three-layer polarizing film having a waveplate 111 (QWP), a reflective polarizer 112 (RP) and a linear polarizer 113 (LP), a receiver 2 is configured to receive two reflected light signals, one reflected light signal 101 from the reflective polarizer 112 (RP), and one reflected light signal 102 from the waveplate 111 (QWP). The reflected light signal 102 from the waveplate 111 (QWP) will interfere with the reflected light signal 101 from the reflective polarizer 112 (RP), resulting in that the measurement result of the surface topography of the reflective polarizer 112 (RP) is inaccurate, so it is necessary to improve this problem.

SUMMARY OF THE INVENTION

The primary object of the present invention is to provide a multilayer film measuring device and a multilayer film measuring method. By providing a circular polarization module between a measuring module and a multilayer film to be measured, the interference of the reflected light signals of the multilayer film to the measuring module can be eliminated, so as to achieve accurate measurement of multilayer optical films.

According to one aspect of the present invention, a multilayer film measuring device is provided, comprising a measuring module, a multilayer film to be measured and a circular polarization module. The measuring module has a projection port and a receiving port on one side thereof. The measuring module further includes a light source unit and a receiving module. The light source unit is located corresponding to the projection port for generating a laser beam. The receiving module is located corresponding to the receiving port. The multilayer film to be measured has a first waveplate, a reflective polarizer, and a first linear polarizer. The reflective polarizer is located between the first waveplate and the first linear polarizer. The first waveplate is located close to the measuring module. The circular polarization module is located between the measuring module and the multi-layer film to be measured. The circular polarization module has a second waveplate and a second linear polarizer. The second linear polarizer is located close to the measuring module. When the light source unit projects the laser beam from the projection port, the laser beam passes through the circular polarization module to the multilayer film to be measured, the reflective polarizer completely reflects the laser beam through the circular polarization module to the receiving port, and the laser beam shifted by a surface of the first waveplate is absorbed by the second linear polarizer.

Preferably, the laser beam is defined in the shape of a cone rotating around a rotation axis. The laser beam has a vertex. The vertex is located on an end face of the light source unit. The light source unit extends in the direction of the rotation axis and is connected to the projection port. The multilayer film to be tested is located on a carrying plane that is perpendicular to the rotation axis. The carrying plane is defined to extend along a first direction and a second direction. The first direction is perpendicular to the second direction.

Preferably, a fast axis of the first waveplate and a transmission axis of the reflective polarizer form an included angle of 45 degrees or 135 degrees. The transmission axis of the reflective polarizer, a transmission axis of the first linear polarizer and the first direction are parallel to each other.

Preferably, the second linear polarizer extends in the first direction. The second waveplate is a quarter-wave plate. A slow axis of the second waveplate and the first direction form an included angle of 45 degrees.

According to another aspect of the present invention, a multilayer film measuring method is provided, comprising the following steps:

(a) providing a measuring module, a multilayer film to be measured and a circular polarization module, wherein the measuring module includes a light source unit and a receiving module, the light source unit and the receiving module are located on a same side of the measuring module, the light source unit is configured to generate a laser beam, the laser beam is defined in the shape of a cone rotating around a rotation axis, the multilayer film to be measured has a first waveplate, a reflective polarizer and a first linear polarizer, the reflective polarizer is located between the first waveplate and the first linear polarizer, the circular polarization module has a second waveplate and a second linear polarizer;
(b) placing the multilayer film to be measured on a carrying plane that is perpendicular to the rotation axis, wherein the first waveplate is located close to the measuring module;
(c) placing the circular polarization module between the measuring module and the multilayer film to be measured, wherein the second linear polarizer is located close to the measuring module;
(d) adjusting the circular polarization module to be parallel to the carrying plane;
(e) determining whether the circular polarization module is parallel to the carrying plane; wherein when the circular polarization module is not parallel to the carrying plane, the step (d) is repeated; when the circular polarization module is parallel to the carrying plane, a slow axis of the second waveplate and a fast axis of the first waveplate are adjusted to form an included angle of 45 degrees;
(f) using the light source unit to generate the laser beam to pass through the circular polarization module to the multilayer film to be measured;
(g) using the reflective polarizer to completely reflect the laser beam to pass through the circular polarization module to the receiving port, and using the second linear polarizer to block the laser beam shifted by a surface of the first waveplate.

Preferably, the step (a) further includes the following steps:
(a1) adjusting a transmission axis of the reflective polarizer to be parallel to a transmission axis of the first linear polarizer;
(a2) determining whether the transmission axis of the reflective polarizer is parallel to the transmission axis of the first linear polarizer; wherein when the transmission axis of the reflective polarizer is not parallel to the transmission axis of the first linear polarizer, the step (a1) is repeated; when the transmission axis of the reflective polarizer is parallel to the transmission axis of the first linear polarizer, step (a3) is performed;
(a3) adjusting the fast axis of the first waveplate and the transmission axis of the reflective polarizer to form an included angle of 45 degrees or 135 degrees;
(a4) determining whether the included angle between the fast axis of the first waveplate and the transmission axis of the reflective polarizer is 45 degrees or 135 degrees; wherein when the included angle between the fast axis of the first waveplate and the transmission axis of the reflective polarizer is not 45 degrees or 135 degrees, the step (a3) is repeated; when the included angle between the fast axis of the first waveplate and the transmission axis of the reflective polarizer is 45 degrees or 135 degrees, the step (b) is performed.

Preferably, the step (e) further includes the following step:
(e1) determining whether the included angle between the slow axis of the second waveplate and the fast axis of the first waveplate is 45 degrees; wherein when the included angle between the slow axis of the second waveplate and the fast axis of the first waveplate is not 45 degrees, the step (e) is repeated; when the included angle between the slow axis of the second waveplate and the fast axis of the first waveplate is 45 degrees, the step (f) is performed.

DETAILED DESCRIPTION OF THE PREFERRED EMBODIMENTS

Embodiments of the present invention will now be described, by way of example only, with reference to the accompanying drawings.

Figure 2:
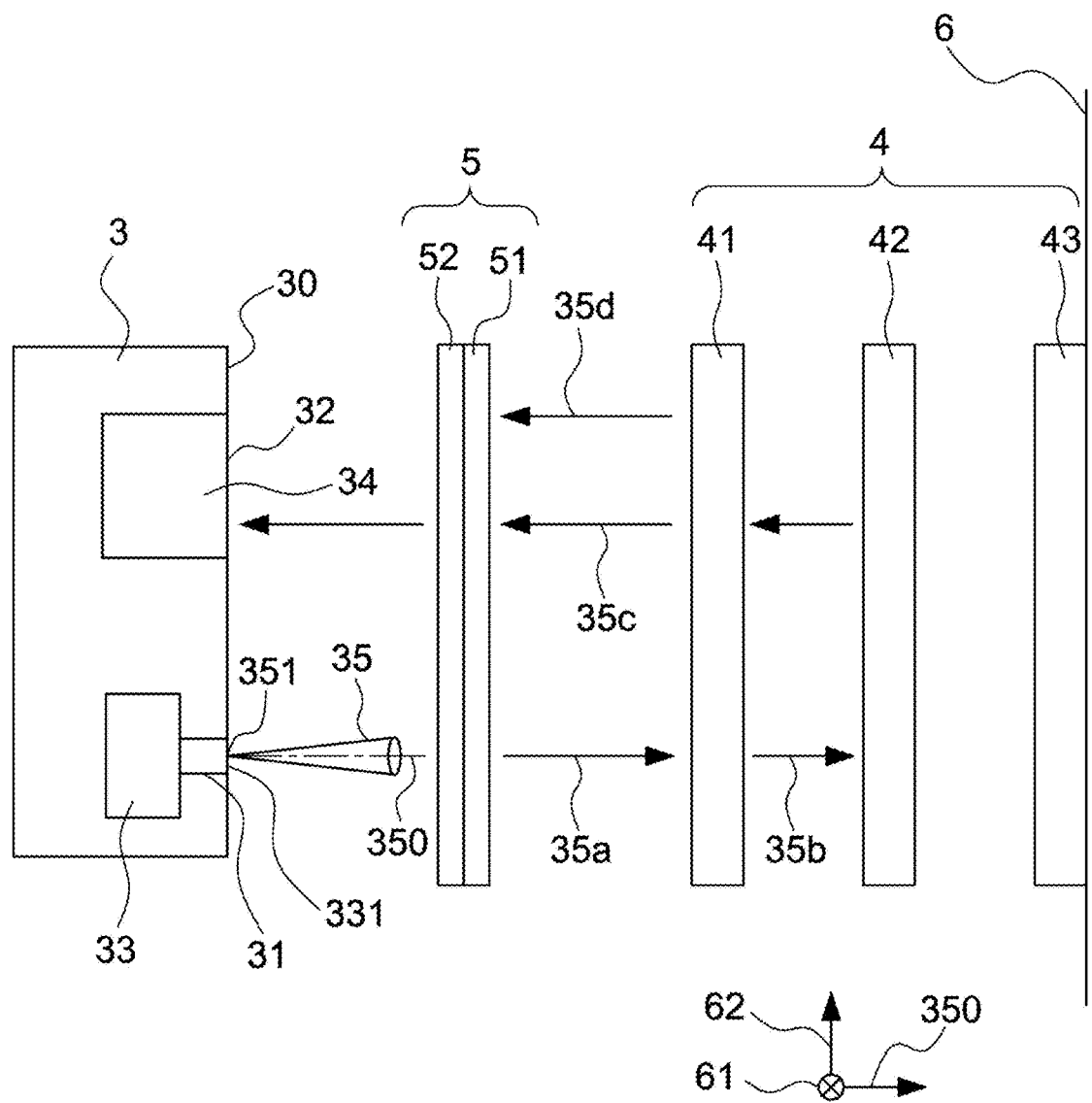
FIG. 2 is a schematic view of a multilayer film measuring device according to a preferred embodiment of the present invention.
Figure 3:
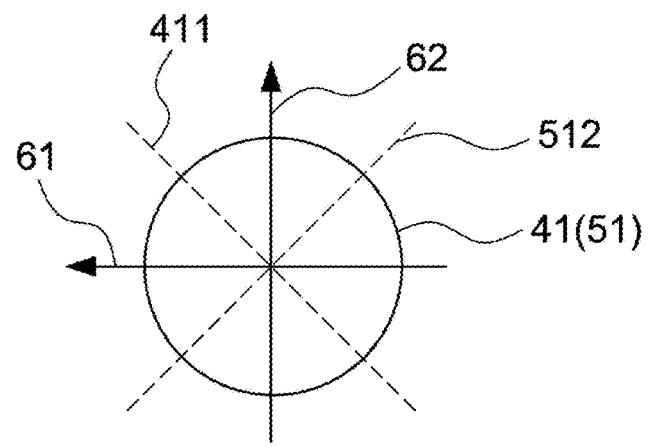
FIG. 3 is a schematic view of the multilayer film of the present invention according to the preferred embodiment of the present invention.
Figure 3:
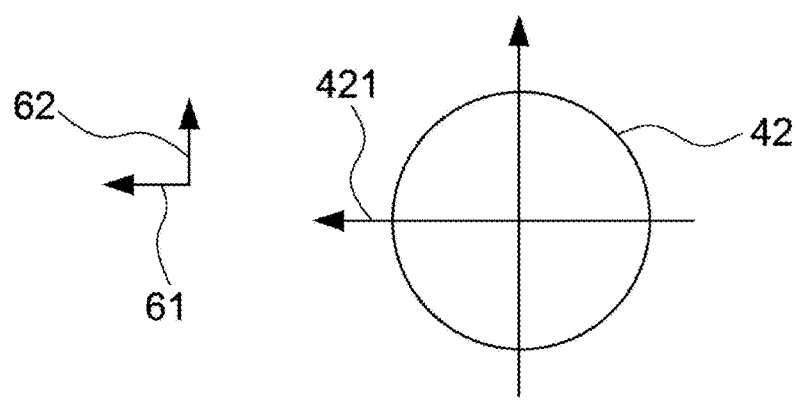
Figure 3:
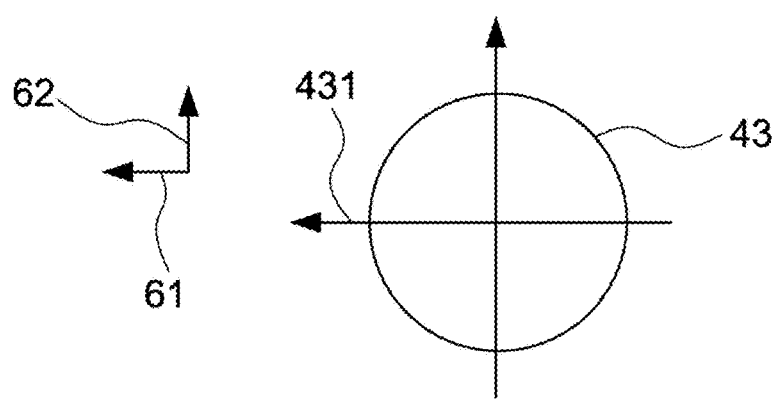

FIG. 2 is a schematic view of a multilayer film measuring device according to a preferred embodiment of the present invention. FIG. 3 is a schematic view of the multilayer film of the present invention according to the preferred embodiment of the present invention. The multilayer film measuring device of the present invention comprises a measuring module 3, a multilayer film 4 to be measured and a circular polarization module 5. The measuring module 3 is a frame structure having a projection port 31 and a receiving port 32 on one side 30 thereof. The measuring module 3 further includes a light source unit 33 and a receiving module 34. The light source unit 33 is located corresponding to the projection port 31 for generating a laser beam 35. The receiving module 34 is located corresponding to the receiving port 32.

In a preferred embodiment of the present invention, the laser beam 35 is defined in the shape of a cone rotating around a rotation axis 350. The laser beam 35 has a vertex 351. The vertex 351 is located on an end face 331 of the light source unit 33. The light source unit 33 extends in the direction of the rotation axis 350 and is connected to the projection port 31. The multilayer film 4 to be tested is located on a carrying plane 6 that is perpendicular to the rotation axis 350. The carrying plane 6 is defined to extend along a first direction 61 and a second direction 62. The first direction 61 is perpendicular to the second direction 62.

The multilayer film 4 to be measured has a first waveplate (QWP) 41, a reflective polarizer (RP) 42 and a first linear polarizer (LP) 43. The reflective polarizer 42 is located between the first waveplate 41 and the first linear polarizer 43. The first waveplate 41 is located close to the measuring module 3. In a preferred embodiment of the present invention, a fast axis 411 of the first waveplate 41 and a transmission axis 421 of the reflective polarizer 42 form an included angle of 45 degrees or 135 degrees. The transmission axis 421 of the reflective polarizer 42, a transmission axis 431 of the first linear polarizer 43 and the first direction 61 are parallel to each other.

The circular polarization module 5 is located between the measuring module 3 and the multilayer film 4 to be measured. The circular polarization module 5 has a second waveplate 51 and a second linear polarizer 52. The second linear polarizer 52 is located close to the measuring module 3. In a preferred embodiment of the present invention, the second linear polarizer 52 extends in the first direction 61. The second waveplate 51 is a quarter-wave plate. A slow axis 412 of the second waveplate 51 and the first direction 61 form an included angle of 45 degrees.

Figure 1:
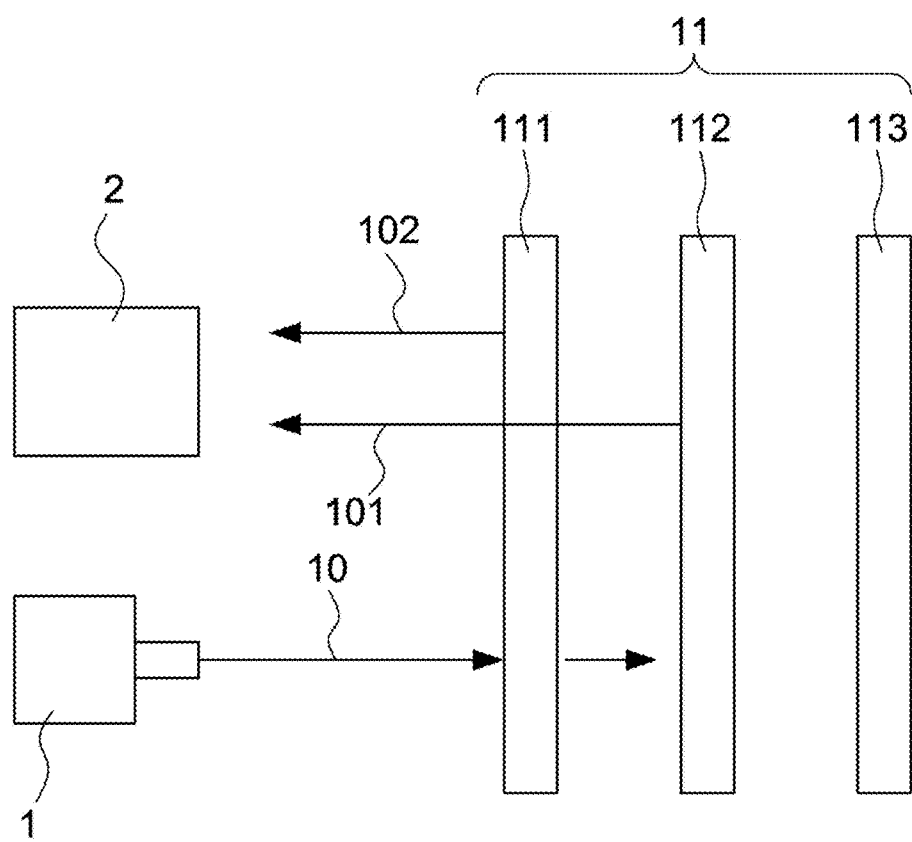
FIG. 1 is a schematic view of a conventional measuring device.
Figure 4A:
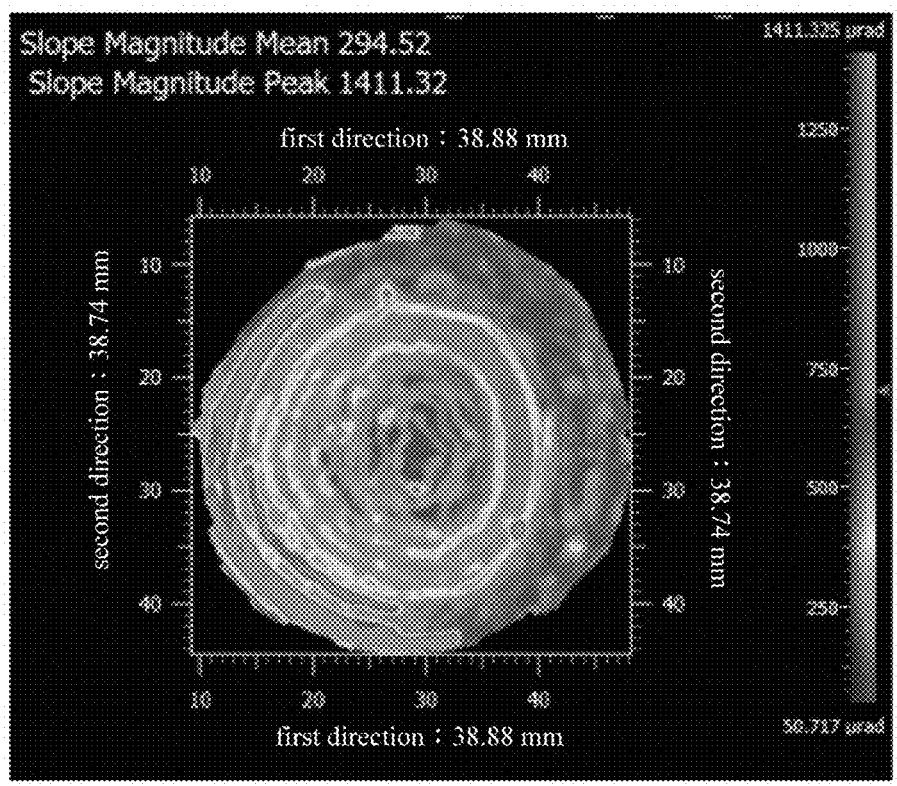
FIG. 4A is a schematic view of the surface measurement result of the measuring device of FIG. 1, wherein the reflected light signal is interfered.
Figure 4B:
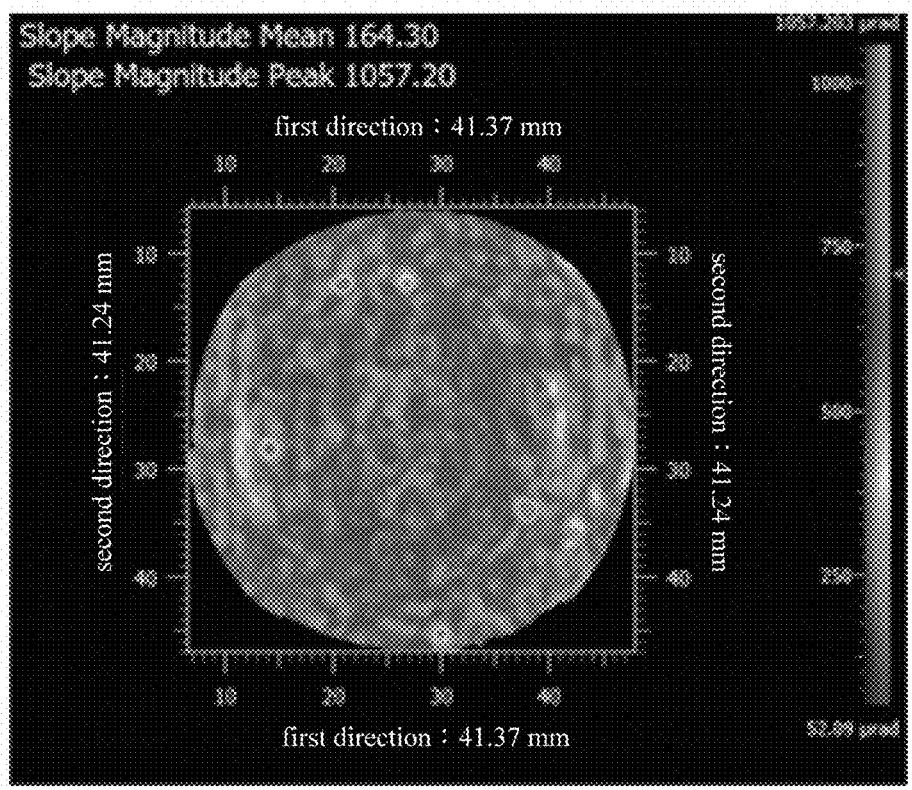
FIG. 4B is a schematic view of the surface measurement result of the multi-layer film measuring device of FIG. 2, wherein the reflected light signal is not interfered.

When the light source unit 33 projects the laser beam 35 from the projection port 31, the laser beam 35 will pass through the circular polarization module 5 to the multi-layer film 4 to be measured. After the incident laser beam 35 passes through the circular polarization module 5, it will be converted into a circularly polarized light 35a to enter the multilayer film 4 to be measured. The circularly polarized light 35a passes through the first waveplate 41 of the multilayer film 4 to be measured and is converted into linearly polarized light 35b to the surface of the reflective polarizer 42 for total reflection. The reflective polarizer 42 completely reflects the first reflected light signal 35c through the circular polarization module 5 to the receiving port 32, and the receiving module 34 measures the surface topography of the reflective polarizer 42. The reflected light interference signal 35d shifted by the surface of the first waveplate 41 is absorbed by the second linear polarizer 52 and does not enter the receiving module 34. FIG. 4B is a schematic view of the surface measurement result of the multilayer film measuring device of FIG. 2, wherein the reflected light signal is not interfered. As shown in the results of the figures, the measured waviness in the measuring device of FIG. 2 is 164 microradians (μrad), and the measured waviness in the measuring device of FIG. 1, shown in FIG. 4A, is 294 microradians (μrad), so the surface topography of the reflective polarizer 42 is presented more precisely.

Figure 5A:
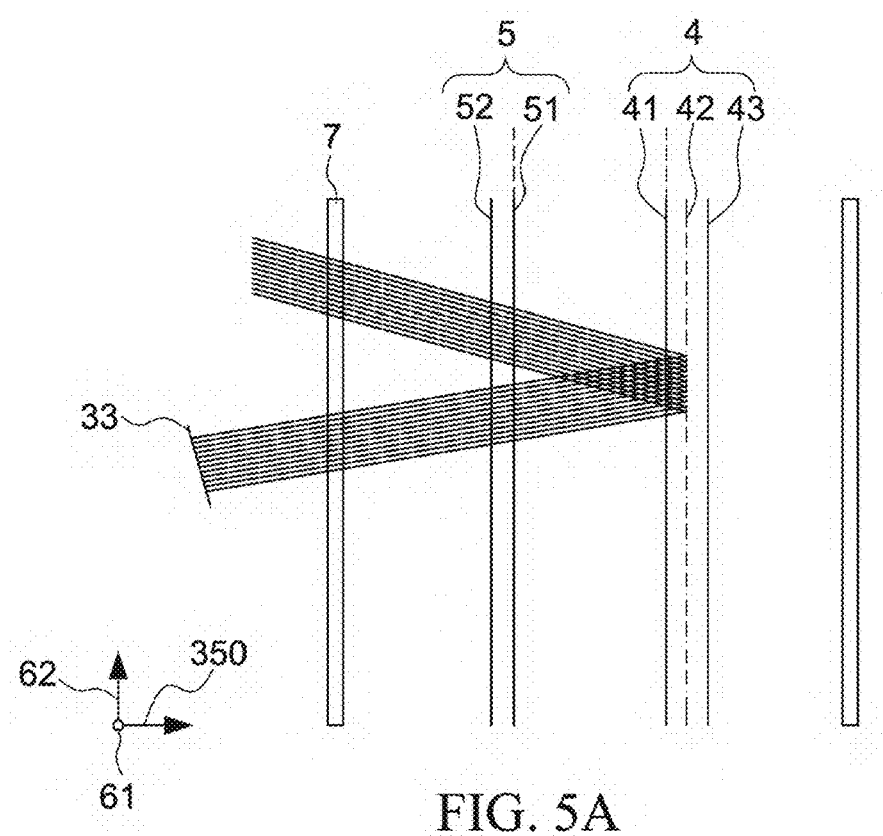
FIG. 5A is a schematic view of analyzing the light signal reflected by the reflective polarizer of the present invention.
Figure 5B:
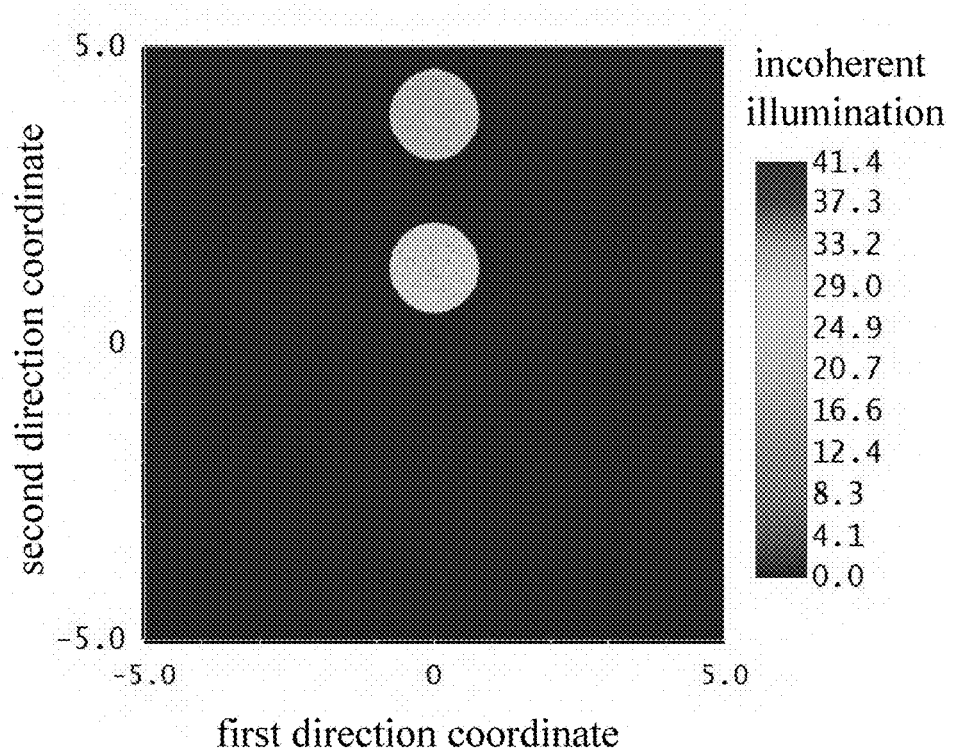
FIG. 5B is a schematic view of analyzing the light signal reflected by the reflective polarizer to the receiving module of the present invention.
Figure 6A:
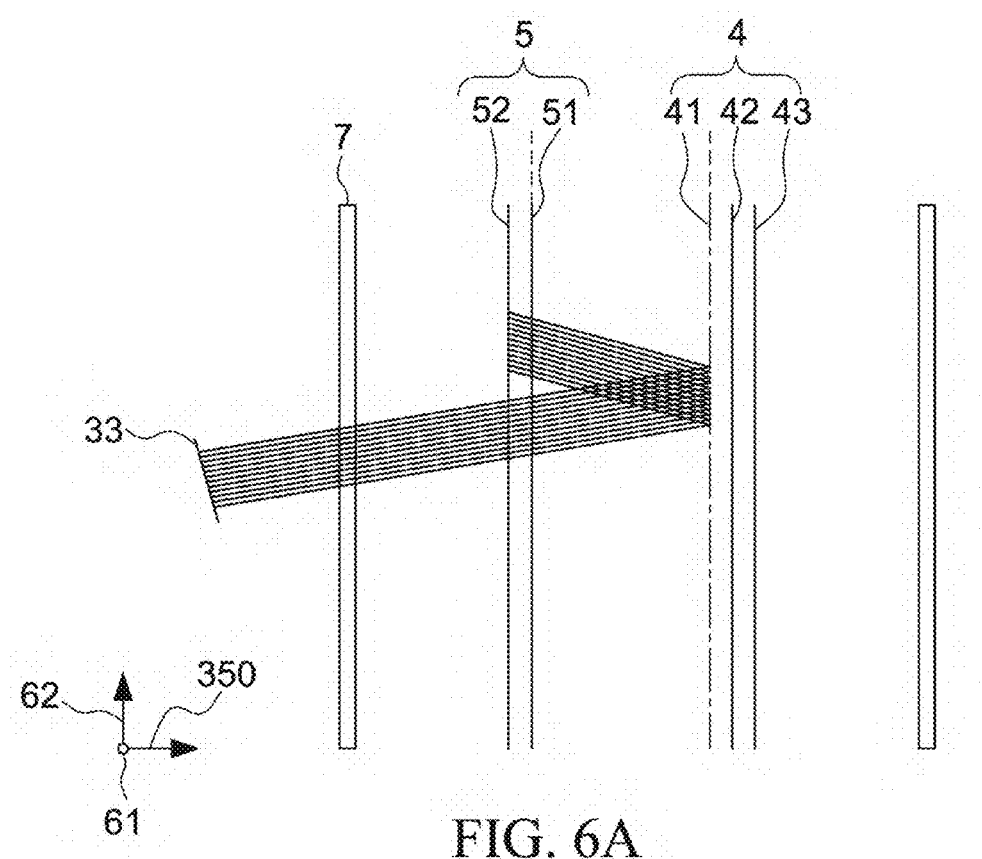
FIG. 6A is a schematic view of analyzing the light signal shifted by the first waveplate of the present invention.
Figure 6B:
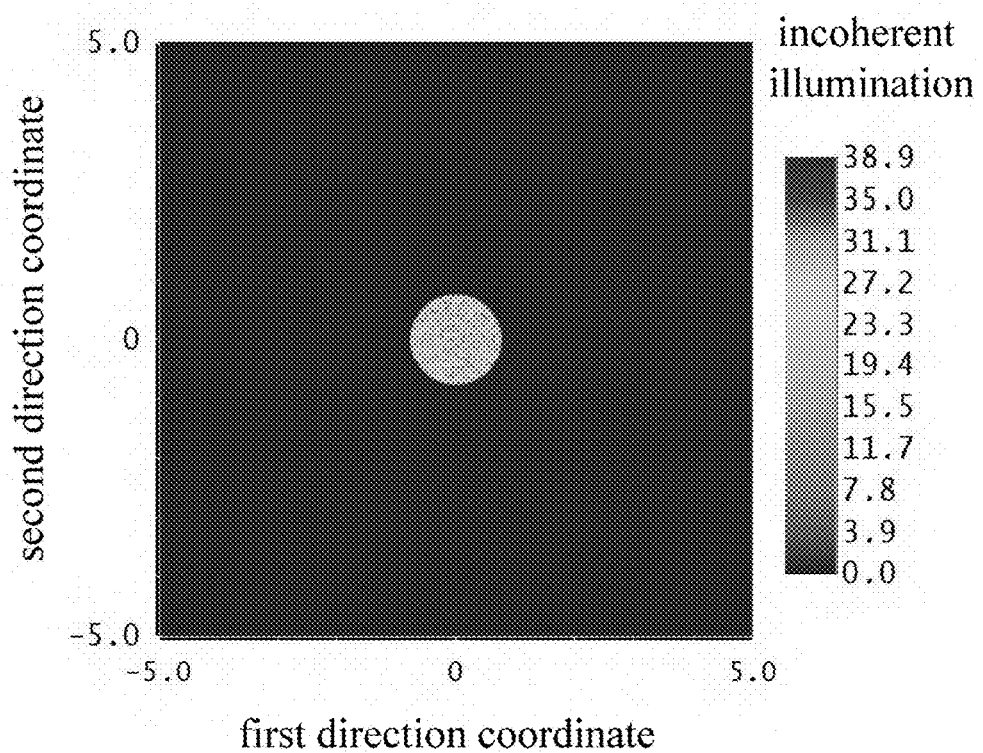
FIG. 6B is a schematic view of analyzing the light signal shifted by the first waveplate to the receiving module of the present invention.

FIG. 5A is a schematic view of analyzing the light signal reflected by the reflective polarizer of the present invention. FIG. 5B is a schematic view of analyzing the light signal reflected by the reflective polarizer to the receiving module of the present invention. FIG. 6A is a schematic view of analyzing the light signal shifted by the first waveplate of the present invention. FIG. 6B is a schematic view of analyzing the light signal shifted by the first waveplate to the receiving module of the present invention. An analog detection surface 7 is provided between the measuring module 3 and the multi-layer film 4 to be measured. The analog detection surface 7 is the photoresponse presented by the polarization of the first direction 61. FIG. 5A and FIG. 5B show the analysis of the reflected light signal on the surface of the reflective polarizer 42. Light energy can indeed directly pass through the circular polarization module 5 and return to the analog detection surface 7. FIG. 6A and FIG. 6B show the analysis of the reflected light signal on the surface of the first waveplate 41. The reflected light signal from the surface of the first waveplate 41 is absorbed by the second linear polarizer 52 of the circular polarization module 5 and will not enter the analog detection surface 7.

Figure 7A:
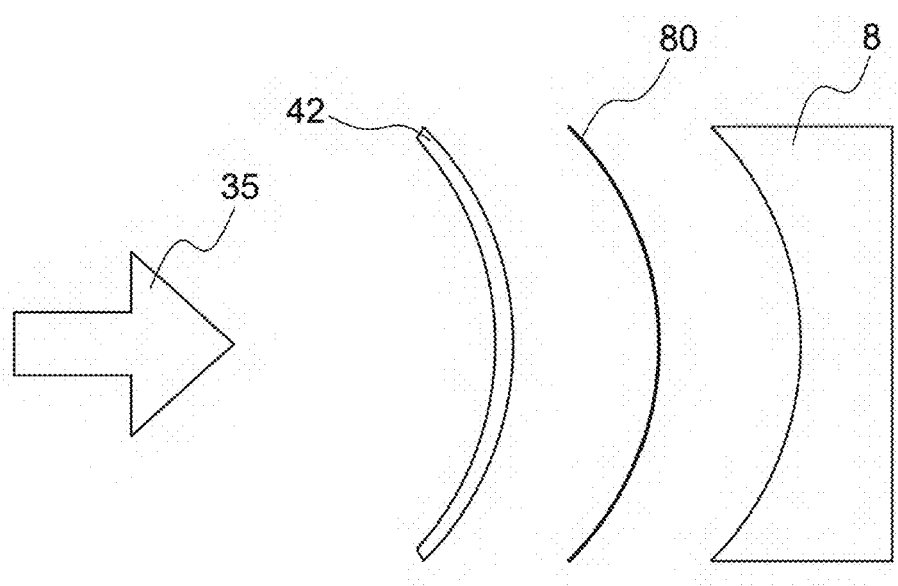
FIG. 7A is a schematic view of testing the light signal reflected by a single-layer reflective polarizer.
Figure 7B:
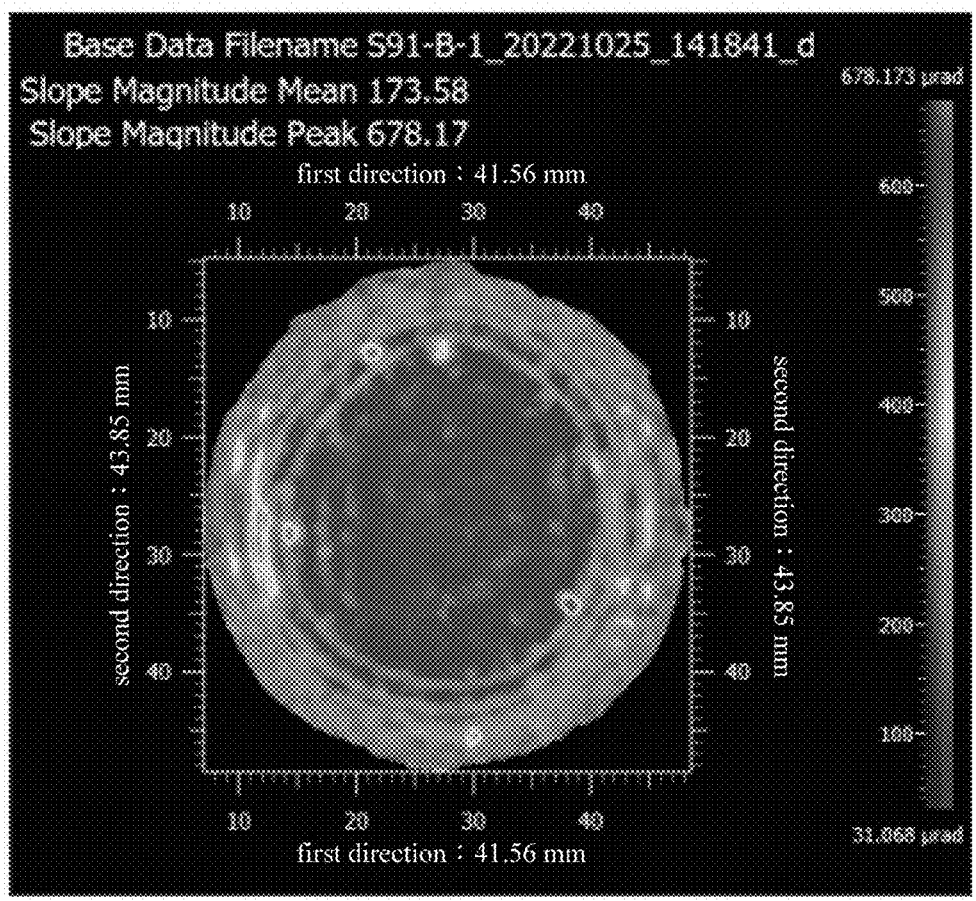
FIG. 7B is a schematic view illustrating the surface topography result of the single-layer reflective polarizer.
Figure 8A:
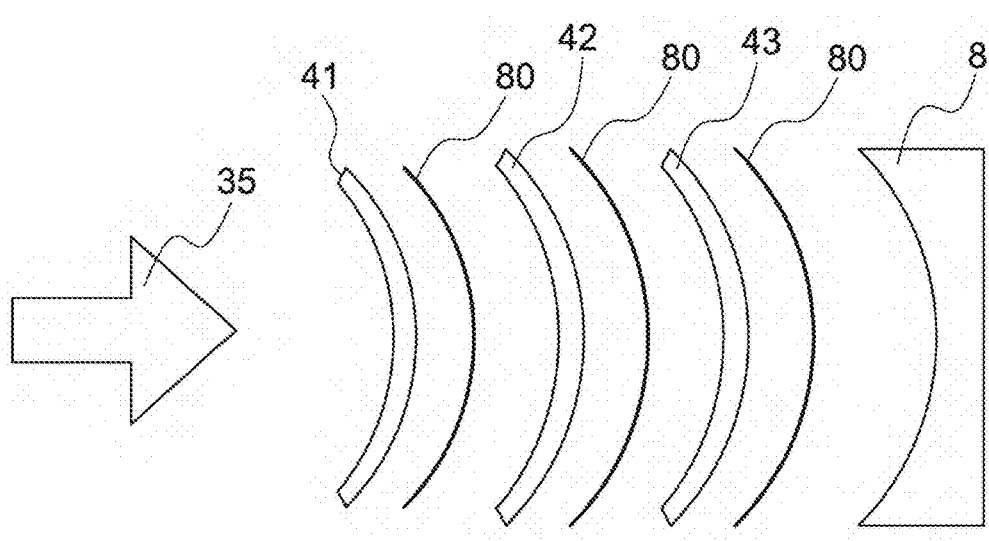
FIG. 8A is a schematic view of testing the light signal reflected by a conventional multilayer film.
Figure 8B:
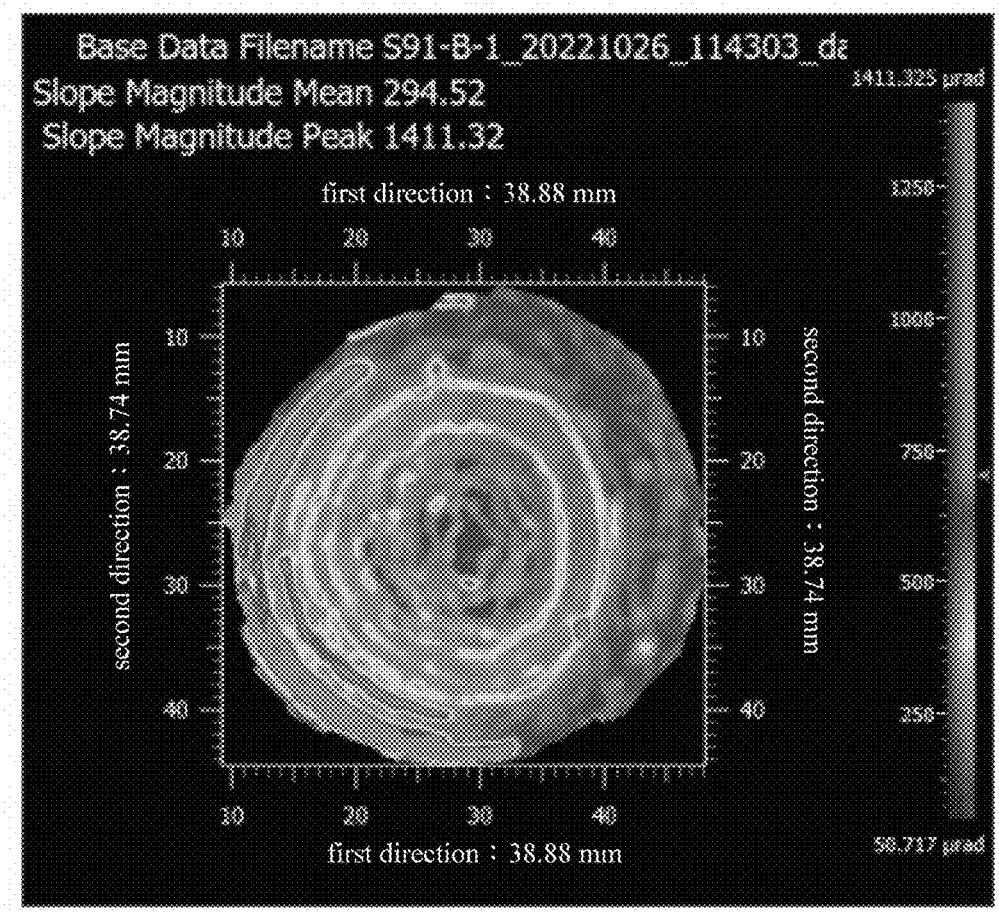
FIG. 8B is a schematic view illustrating the surface topography result of the conventional multilayer film.
Figure 9A:
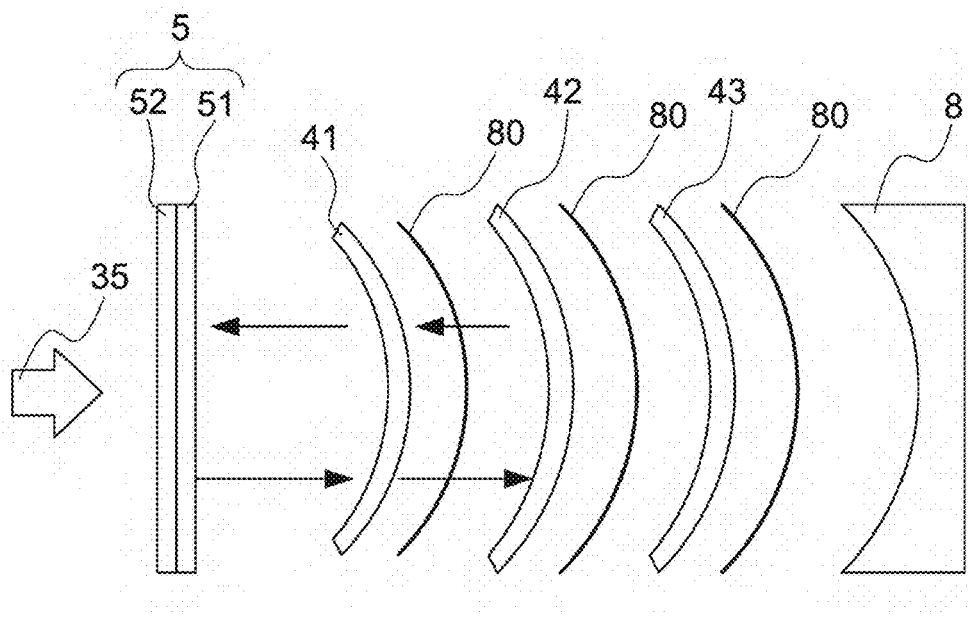
FIG. 9A is a schematic view of testing the light signal reflected by the multi-layer film of the present invention.
Figure 9B:
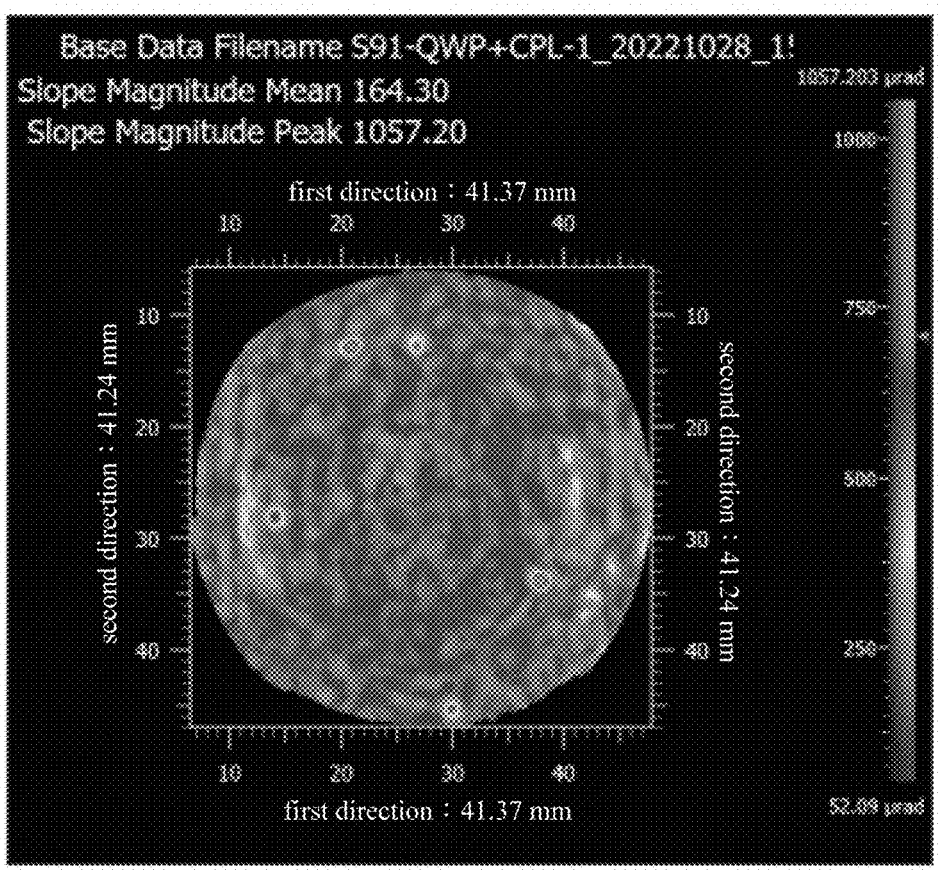
FIG. 9B is a schematic view illustrating the surface topography result of the multilayer film of the present invention.

FIG. 7A is a schematic view of testing the light signal reflected by a single-layer reflective polarizer. FIG. 7B is a schematic view illustrating the surface topography result of the single-layer reflective polarizer. FIG. 8A is a schematic view of testing the light signal reflected by a conventional multilayer film. FIG. 8B is a schematic view illustrating the surface topography result of the conventional multilayer film. FIG. 9A is a schematic view of testing the light signal reflected by the multilayer film of the present invention. FIG. 9B is a schematic view illustrating the surface topography result of the multilayer film of the present invention. First, a lens 8 is provided. The lens 8 is a concave lens. The surface of the lens 8 is connected to an object to be tested via optical clear adhesive (OCA) 80. As shown in FIG. 7A, the waviness slope mean of the single-layer reflective polarizer 42 is 173.58 microradians (μrad). As shown in FIG. 8B, the waviness slope mean of the multilayer film 4 is 294.52 microradians (μrad). As shown in FIG. 9B, the waviness slope mean of the multilayer film 4 provided with the circular polarization module 5 is 164.30 microradians (μrad). In comparison, the multilayer film 4 provided with the circular polarization module 5 can present the actual situation of the waviness slope of the single-layer reflective polarizer 42 better.

Figure 10:
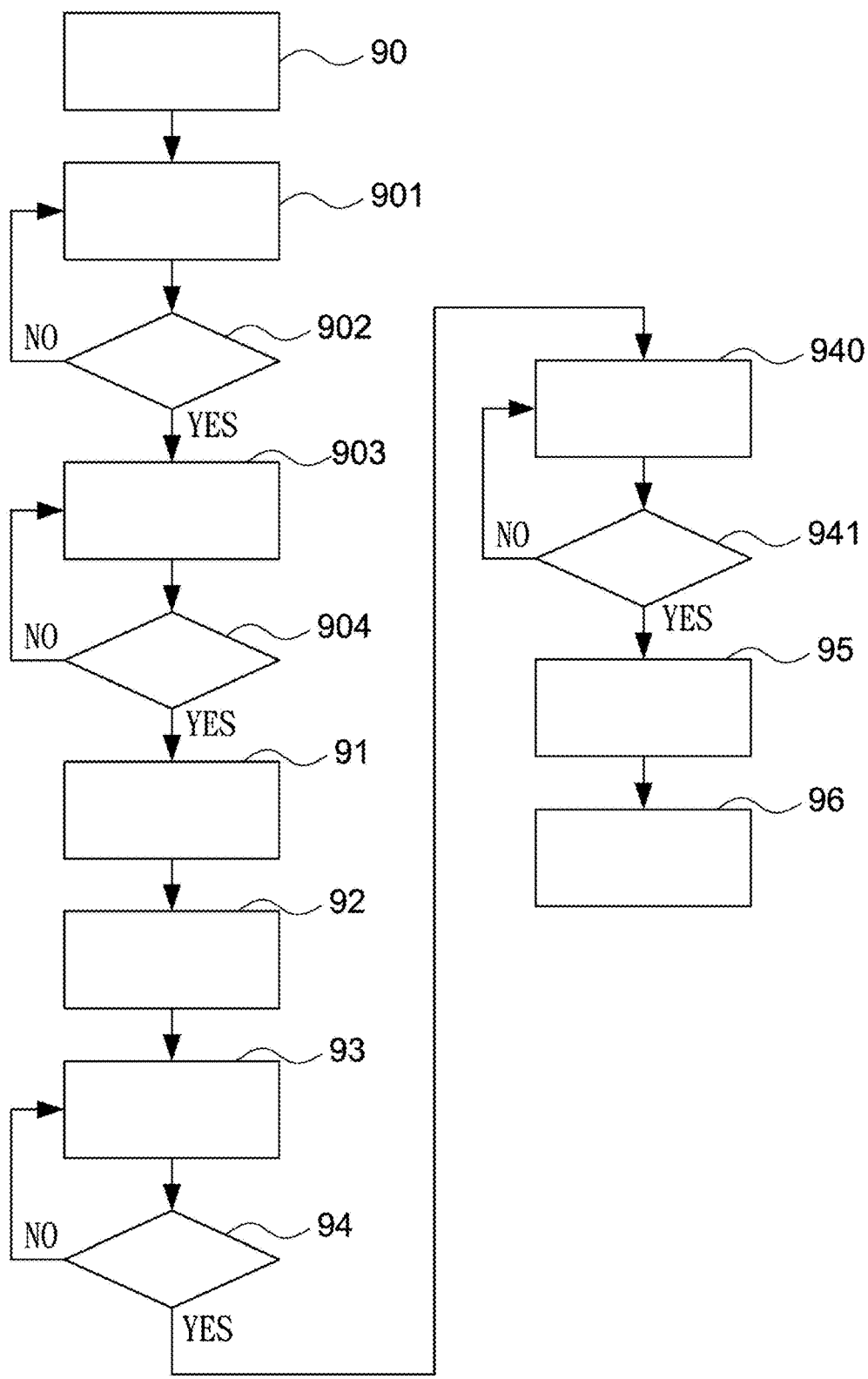
FIG. 10 is a block diagram of a multilayer film measuring method according to a preferred embodiment of the present invention.

FIG. 10 is a block diagram of a multilayer film measuring method according to a preferred embodiment of the present invention. The multilayer film measuring method of the present invention comprises the following steps:

Step 90: providing a measuring module, a multilayer film to be measured, and a circular polarization module. The measuring module includes a light source unit and a receiving module. The light source unit and the receiving module are located on the same side of the measuring module. The light source unit is configured to generate a laser beam. The laser beam is defined in the shape of a cone rotating around a rotation axis. The multilayer film to be measured has a first waveplate, a reflective polarizer, and a first linear polarizer. The reflective polarizer is located between the first waveplate and the first linear polarizer. The circular polarization module has a second waveplate and a second linear polarizer.

Step 901: adjusting a transmission axis of the reflective polarizer to be parallel to a transmission axis of the first linear polarizer.

Step 902: determining whether the transmission axis of the reflective polarizer is parallel to the transmission axis of the first linear polarizer; wherein when the transmission axis of the reflective polarizer is not parallel to the transmission axis of the first linear polarizer, step 901 is repeated; when the transmission axis of the reflective polarizer is parallel to the transmission axis of the first linear polarizer, step 903 is performed.

Step 903: adjusting a fast axis of the first waveplate and the transmission axis of the reflective polarizer to form an included angle of 45 degrees or 135 degrees.

Step 904: determining whether the included angle between the fast axis of the first waveplate and the transmission axis of the reflective polarizer is 45 degrees or 135 degrees; wherein when the included angle between the fast axis of the first waveplate and the transmission axis of the reflective polarizer is not 45 degrees or 135 degrees, step 903 is repeated; when the included angle between the fast axis of the first waveplate and the transmission axis of the reflective polarizer is 45 degrees or 135 degrees, step 91 is performed.

Step 91: placing the multilayer film to be measured on a carrying plane that is perpendicular to the rotation axis, wherein the first waveplate is located close to the measuring module.

Step 92: placing the circular polarization module between the measuring module and the multilayer film to be measured, wherein the second linear polarizer is located close to the measuring module.

Step 93: adjusting the circular polarization module to be parallel to the carrying plane.

Step 94: determining whether the circular polarization module is parallel to the carrying plane; wherein when the circular polarization module is not parallel to the carrying plane, step 93 is repeated; when the circular polarization module is parallel to the carrying plane, step 940 is performed;

Step 940: adjusting a slow axis of the second waveplate and a fast axis of the first waveplate to form an included angle of 45 degrees.

Step 941: determining whether the included angle between the slow axis of the second waveplate and the fast axis of the first waveplate is 45 degrees; wherein when the included angle between the slow axis of the second waveplate and the fast axis of the first waveplate is not 45 degrees, step 94 is repeated; when the included angle between the slow axis of the second waveplate and the fast axis of the first waveplate is 45 degrees, step 95 is performed.

Step 95: using the light source unit to generate the laser beam to pass through the circular polarization module to the multilayer film to be measured.

Step 96: using the reflective polarizer to completely reflect the laser beam to pass through the circular polarization module to the receiving port, and using the second linear polarizer to block the laser beam shifted by the surface of the first waveplate.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multilayer film measuring device, comprising:
   a measuring module, having a projection port and a receiving port on one side thereof, the measuring module further including a light source unit, the light source unit being located corresponding to the projection port for generating a laser beam;
   a multilayer film to be measured, having a first waveplate and a reflective polarizer, wherein the first waveplate is closer to the measuring module than the reflective polarizer;
   a circular polarization module, located between the measuring module and the multilayer film to be measured, the circular polarization module having a second waveplate and a second linear polarizer, wherein the second linear polarizer is closer to the measuring module than the second waveplate;
   wherein when the light source unit projects the laser beam from the projection port, the laser beam passes through the circular polarization module to the multilayer film to be measured, the reflective polarizer completely reflects the laser beam through the circular polarization module to the receiving port, and the laser beam shifted by a surface of the first waveplate is absorbed by the second linear polarizer.

2. The multilayer film measuring device as claimed in claim 1, wherein the laser beam is defined in the shape of a cone rotating around a rotation axis, the laser beam having a vertex, the vertex is located on an end face of the light source unit, and the light source unit extends in the direction of the rotation axis and is connected to the projection port.

3. The multilayer film measuring device as claimed in claim 2, wherein the multilayer film to be tested is located on a carrying plane that is perpendicular to the rotation axis, the carrying plane is defined to extend along a first direction and a second direction, and the first direction is perpendicular to the second direction.

4. The multilayer film measuring device as claimed in claim 3, wherein a fast axis of the first waveplate and a transmission axis of the reflective polarizer form an included angle of 45 degrees or 135 degrees, and the transmission axis of the reflective polarizer, a transmission axis of the first linear polarizer and the first direction are parallel to each other.

5. The multilayer film measuring device as claimed in claim 3, wherein the second linear polarizer extends in the first direction, the second waveplate is a quarter-wave plate, and a slow axis of the second waveplate and the first direction form an included angle of 45 degrees.

6. The multilayer film measuring device as claimed in claim 1, wherein the multilayer film to be measured further has a first linear polarizer, and the reflective polarizer is located between the first waveplate and the first linear polarizer.

7. A multilayer film measuring method, comprising the following steps:
   (a) providing a measuring module, a multilayer film to be measured and a circular polarization module, wherein the measuring module includes a light source, the light source unit is on a side of the measuring module, the light source unit is configured to generate a laser beam, the laser beam is defined in the shape of a cone rotating around a rotation axis, the multilayer film to be measured has a first waveplate, a reflective polarizer and a first linear polarizer, the reflective polarizer is located between the first waveplate and the first linear polarizer, the circular polarization module has a second waveplate and a second linear polarizer;
   (b) placing the multilayer film to be measured on a carrying plane that is perpendicular to the rotation axis, wherein the first waveplate is closer to the measuring module than the reflective polarizer;
   (c) placing the circular polarization module between the measuring module and the multilayer film to be measured, wherein the second linear polarizer is closer to the measuring module than the second waveplate;
   (d) adjusting the circular polarization module to be parallel to the carrying plane;
   (e) determining whether the circular polarization module is parallel to the carrying plane; wherein when the circular polarization module is not parallel to the carrying plane, the step (d) is repeated; when the circular polarization module is parallel to the carrying plane, a slow axis of the second waveplate and a fast axis of the first waveplate are adjusted to form an included angle of 45 degrees;

(f) using the light source unit to generate the laser beam to pass through the circular polarization module to the multilayer film to be measured;

(g) using the reflective polarizer to completely reflect the laser beam to pass through the circular polarization module to the receiving port, and using the second linear polarizer to block the laser beam shifted by a surface of the first waveplate.

8. The multilayer film measuring method as claimed in claim 7, the step (a) further includes the following steps:

(a1) adjusting a transmission axis of the reflective polarizer to be parallel to a transmission axis of the first linear polarizer;

(a2) determining whether the transmission axis of the reflective polarizer is parallel to the transmission axis of the first linear polarizer; wherein when the transmission axis of the reflective polarizer is not parallel to the transmission axis of the first linear polarizer, the step (a1) is repeated; when the transmission axis of the reflective polarizer is parallel to the transmission axis of the first linear polarizer, step (a3) is performed;

(a3) adjusting the fast axis of the first waveplate and the transmission axis of the reflective polarizer to form an included angle of 45 degrees or 135 degrees;

(a4) determining whether the included angle between the fast axis of the first waveplate and the transmission axis of the reflective polarizer is 45 degrees or 135 degrees; wherein when the included angle between the fast axis of the first waveplate and the transmission axis of the reflective polarizer is not 45 degrees or 135 degrees, the step (a3) is repeated; when the included angle between the fast axis of the first waveplate and the transmission axis of the reflective polarizer is 45 degrees or 135 degrees, the step (b) is performed.

9. The multilayer film measuring method as claimed in claim 8, the step (e) further includes the following step:

(e1) determining whether the included angle between the slow axis of the second waveplate and the fast axis of the first waveplate is 45 degrees; wherein when the included angle between the slow axis of the second waveplate and the fast axis of the first waveplate is not 45 degrees, the step (e) is repeated; when the included angle between the slow axis of the second waveplate and the fast axis of the first waveplate is 45 degrees, the step (f) is performed.

* * * * *